United States Patent
Qu et al.

(10) Patent No.: US 8,923,155 B2
(45) Date of Patent: Dec. 30, 2014

(54) L3 GATEWAY FOR VXLAN

(71) Applicant: Futurewei Technologies, Inc., Plano, TX (US)

(72) Inventors: Xiaorong Qu, Cupertino, CA (US); Weiguo Hao, Shenzhen (CN); Yuanbin Yin, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/887,782

(22) Filed: May 6, 2013

(65) Prior Publication Data

US 2013/0266015 A1    Oct. 10, 2013

Related U.S. Application Data

(63) Continuation of application No. 13/442,312, filed on Apr. 9, 2012.

(51) Int. Cl.
| | |
|---|---|
| *G08C 15/00* | (2006.01) |
| *H04J 3/24* | (2006.01) |
| *H04L 12/28* | (2006.01) |
| *H04L 12/741* | (2013.01) |
| *H04L 12/931* | (2013.01) |

(52) U.S. Cl.
CPC .............. *H04L 45/74* (2013.01); *H04L 49/70* (2013.01)
USPC ............ 370/252; 370/349; 370/392; 370/401

(58) Field of Classification Search
None
See application file for complete search history.

(56) References Cited

U.S. PATENT DOCUMENTS

| | | | | |
|---|---|---|---|---|
| 8,077,604 | B1 * | 12/2011 | Kanekar et al. | 370/219 |
| 2008/0005441 | A1 * | 1/2008 | Droux et al. | 710/306 |
| 2009/0327462 | A1 | 12/2009 | Adams et al. | |
| 2010/0107162 | A1 * | 4/2010 | Edwards et al. | 718/1 |
| 2010/0169446 | A1 | 7/2010 | Linden et al. | |

(Continued)

FOREIGN PATENT DOCUMENTS

| | | |
|---|---|---|
| CN | 101924677 A | 12/2010 |
| CN | 101924707 A | 12/2010 |
| CN | 101980490 A | 2/2011 |

OTHER PUBLICATIONS

Mahalingam, et al., "VXLAN: A Framework for Overlaying Virtualized Layer 2 Networks Over Layer 3 Networks," draft-mahalingam-dutt-dcops-vxlan-00.txt, Aug. 26, 2011, 20 pages.

"Virtual Bridged Local Area Networks," IEEE Standard for Local and Metropolitan Area Networks, IEEE Computer Society, IEEE Std 802.1Q-2005, May 19, 2006, 301 pages.

(Continued)

*Primary Examiner* — Ashley Shivers
(74) *Attorney, Agent, or Firm* — Conley Rose, P.C.; Grant Rodolph; William H. Dietrich

(57) ABSTRACT

In an embodiment, the disclosure includes an apparatus comprising a host component which comprises a virtual switch associated with a virtual machine (VM). The host component is in communication with a routing component which is connected to a network and comprises a network address. The VM sends a communication packet to the virtual switch. The communications packet comprises address information comprising a virtual destination address. The virtual switch replaces the virtual destination address of the communications packet with the network address of the routing component. The disclosure also includes a network comprising a plurality of host components each comprising a virtual switch. The host components are connected to a common routing component. A first virtual switch is designated to respond to address requests and all non-designated virtual switches are configured not to respond to address requests.

21 Claims, 9 Drawing Sheets

(56) References Cited

U.S. PATENT DOCUMENTS

| | | |
|---|---|---|
| 2011/0022695 A1* | 1/2011 | Dalal et al. .................... 709/222 |
| 2011/0085560 A1 | 4/2011 | Chawla et al. |
| 2011/0280572 A1 | 11/2011 | Vobbilisetty et al. |
| 2012/0008528 A1* | 1/2012 | Dunbar et al. ................ 370/255 |
| 2013/0003738 A1* | 1/2013 | Koganti et al. ............... 370/392 |
| 2013/0086236 A1* | 4/2013 | Baucke et al. ................ 709/223 |
| 2013/0124750 A1* | 5/2013 | Anumala et al. ............. 709/232 |
| 2013/0170490 A1* | 7/2013 | Kreeger et al. ............... 370/390 |
| 2013/0250951 A1* | 9/2013 | Koganti ........................ 370/390 |

OTHER PUBLICATIONS

Office Action dated Aug. 20, 2013, 17 pages, U.S. Appl. No. 13/442,312, filed Apr. 9, 2012.

Foreign Communication From a Counterpart Application, PCT Application PCT/CN2013/073957, International Search Report dated Jul. 4, 2013, 6 pages.

Foreign Communication From a Counterpart Application, PCT Application PCT/CN2013/073957, Written Opinion dated Jul. 4, 2013, 4 pages.

* cited by examiner

| D-MAC | Source Port |
|-------|-------------|
| mac1 | vPort1 |
| mac2 | vPort2 |
| mac3 | Physical Port+Vlan |
| mac4 | remoteIP1 |
| mac5 | remoteIP2 |

L3 GATEWAY FOR VXLAN

CROSS-REFERENCE TO RELATED APPLICATIONS

This application is a continuation of U.S. patent application Ser. No. 13/442,312 filed Apr. 9, 2012 by Xiaorong Qu, et al., and entitled "L3 Gateway for VXLAN", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data centers often operate hosting components, such as data servers, for multiple tenants. The push for elastic provisioning of resources required by cloud computing systems and the general push toward virtualization for efficient use of resources often require that multiple tenants be hosted on a single hosting component. For security reasons, data centers use various techniques to isolate network traffic to ensure that one tenant does not have access to another tenant's data. Data centers with layer 2, data link layer, routing systems often use virtual local area networks (VLANs) to isolate network traffic. The VLAN solution may be problematic for large data centers because current data packet standards only allow 4094 unique VLANs to operate in a data center system. Data centers' use of layer 3, network layer, routing systems may also be problematic as multiple tenants may share the same set of layer 3 addresses within their networks, requiring the data center to employ other forms of isolation.

As neither layer 2 nor layer 3 systems provide a completely adequate solution for a large cloud computing environment, various hybrid layer routing schemes have been proposed. These schemes are unworkable for various reasons. One example of such a hybrid layer routing scheme is the recently proposed virtual extensible local area network (VXLAN), which attempts to provide VLAN functionality over a hybrid layer 2 layer 3 network. Components on a VXLAN may send a layer 2 VLAN packet to a VXLAN tunnel endpoint (VTEP). The VTEP may encapsulate the VLAN packet in a VXLAN packet and transmit the resulting VXLAN packet over a layer 3 network. A VTEP in the destination network may receive the VXLAN packet, decapsulate the packet to obtain the original VLAN packet, and forward the VLAN packet over the layer 2 network. This system allows VLAN components in a layer 2 network to reach layer 2 components in a different layer 2 network.

Despite the potential benefits of the VXLAN system, the currently proposed variations are unworkable. One proposed VXLAN standard would require all data traffic in a particular network to pass through a single VXLAN server. A second proposed VXLAN standard would require all data traffic to pass through a single virtual private network (VPN) gateway. In either case, the proposed systems would not function under a heavy data traffic load due to bottlenecks in the data traffic flow. Additionally, the proposed solutions are not adequate for virtual machine (VM) mobility as the VPN gateway or VXLAN server must be reconfigured each time a VM moves from one host machine to another in order to find the VM in the new location. This may be a problem as the elastic provisioning required by cloud computing encourages VM mobility.

SUMMARY

In an embodiment, the disclosure includes an apparatus comprising a host component which comprises a virtual switch associated with a virtual machine (VM). The host component is in communication with a routing component which is connected to a network and comprises a network address. The VM sends a communication packet to the virtual switch. The communications packet comprises address information comprising a virtual destination address. The virtual switch replaces the virtual destination address of the communications packet with the network address of the routing component.

In an embodiment, the disclosure includes a network comprising a plurality of host components each comprising a virtual switch. The host components are connected to a common routing component. A first virtual switch is designated to respond to address requests and all non-designated virtual switches are configured not to respond to address requests.

In an embodiment, the disclosure includes a method comprising sending an address request reply, comprising a virtual media access control (vMAC) address associated with a virtual internet protocol (IP) address, from a virtual switch to a virtual machine (VM). The virtual switch is set as the VM's default gateway. A data packet is sent with the vMAC address from the VM to the virtual switch. The virtual switch swaps the vMAC address of the data packet with the media access control (MAC) address of a first routing component. The data packet is forwarded from the virtual switch to the first routing component.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system for routing packets in a hybrid layer 2/layer 3 network, for example a VXLAN. A virtual switch on a host component may act as the default gateway for all VMs on the host component. The virtual switch may be a VTEP in a VXLAN network. VMs may be assigned a virtual internet protocol (vIP) address and a vMAC address. Each virtual switch may be configured with the physical MAC addresses of an attached routing component for each internet protocol (IP) subnet associated with the VMs on the host component. Each VM may send its outgoing packets to the virtual switch on its host component, using the virtual switch's vMAC as the destination address. The virtual switch may swap the vMAC destination address with the appropriate physical MAC address for the routing component and pass the packet on to the routing component for further routing. This system supports VM mobility because a VM may be moved from one host component to another without significant reconfiguration of the VM or other network components. The virtual switch may ensure packets get routed to the attached routing component instead of routing the packets to the routing component attached to the VMs previous host. In VXLAN networks, this system may allow packets to be transferred through any attached routing component instead of requiring all packets be routed through a single network element, such as a VXLAN server or a VPN gateway. Also disclosed herein is a system for designating a single virtual switch to respond to address requests when multiple virtual switches receive the same request. When multiple virtual switches are attached to the same routing component and are part of the same address group, a single virtual switch may be designated to respond to broadcast, multicast, or anycast address requests and all non-designated virtual switches may not respond. This system may reduce network traffic and may help prevent address resolution protocol (ARP) broadcast storms, i.e. duplicative and unnecessary responses to address requests that may overburden a network and cause slow-downs and/or network failures.

Figure 1:
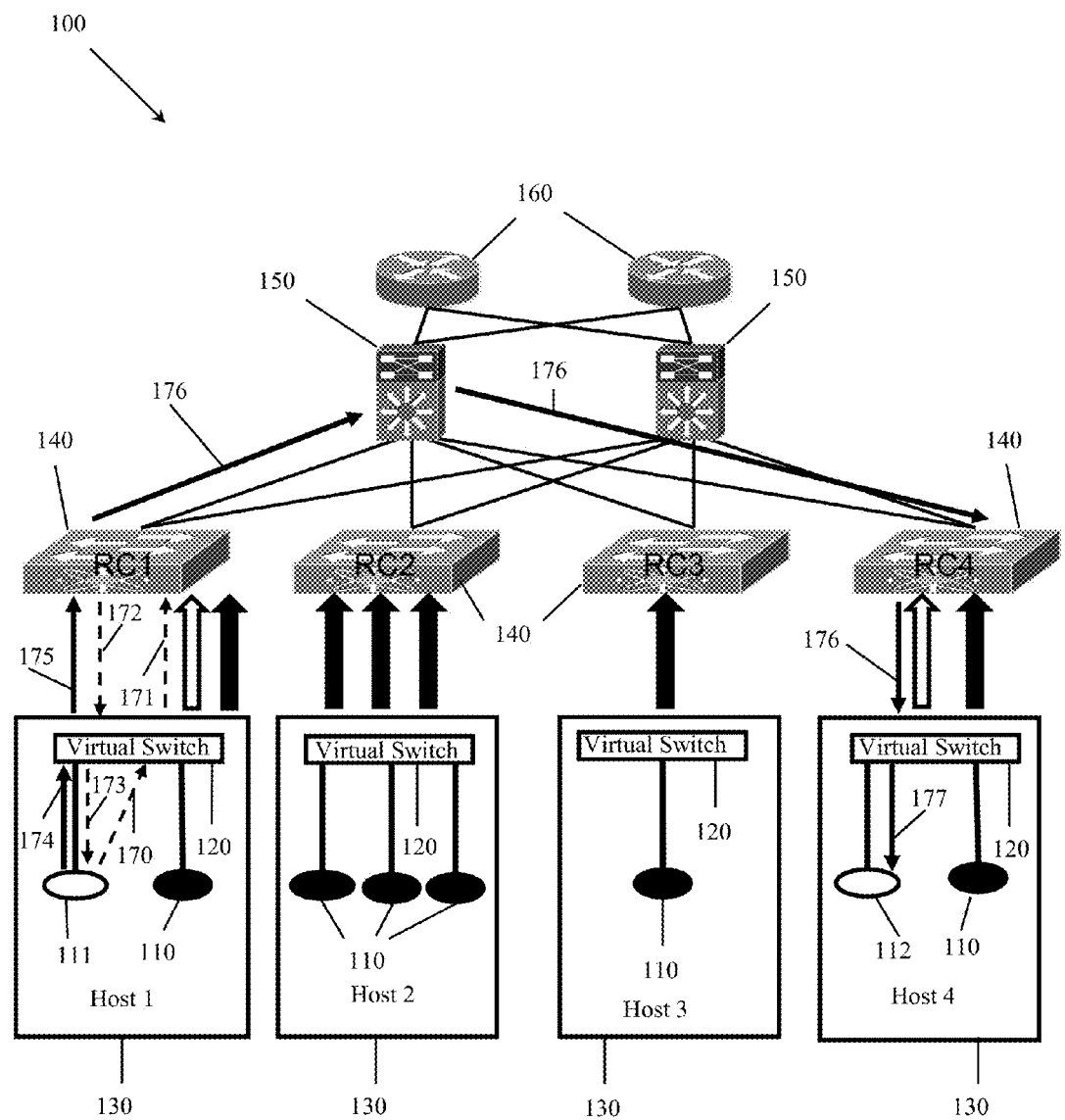
FIG. 1 is a connection diagram of an embodiment of a hybrid layer 2/layer 3 network.

FIG. 1 is a connection diagram of an embodiment of a hybrid layer 2/layer 3 network 100. The network 100 comprises a plurality of host components 130. The host component 130 may be any computer that is attached to a network and offers information resources, services, and/or applications to users or other nodes. The host components 130 may each comprise a virtual switch 120 and one or more VMs 110 associated with the virtual switch 120 by a virtual and/or logical data connection. The virtual switch 120 may be a VTEP in a VXLAN network. Each host component 130 is connected with, and may be in communication with, an attached routing component 140. The routing component 140 may be a Top of Rack (TOR) switch. The routing components 140 may be interconnected through a second tier of routing components 150 over a layer 3 IP network. The second tier routing components 150 may be End of Row (EOR) switches. The second tier routing components 150 may also be connected to a third tier of routing components 160. The third tier routing components may be core (COR) switches which connect to the internet, other networks, other data centers, and/or other data center sections.

Some VMs 110 may be allowed to communicate with each other while other VMs 110 may be segregated for security reasons, because they belong to different tenants, or for other administrative reasons. For example, VMs 110 may communicate with each other because they belong to the same IP subnet, they belong to the same VLAN, they belong to the same VXLAN, or for other reasons. VMs that may communicate with each other are hereinafter referred to being part of an address group. Network 100 comprises VM 111 and VM 112, which are substantially the same as VM 110 except both VM 111 and VM 112 are a part of an address group. For reasons of clarity, VM 111 and VM 112 are presumed to be part of a VXLAN. In an embodiment of a VXLAN, VM 111 may determine to communicate with VM 112. VM 111 may send a default gateway request 170 to the associated virtual switch 120 using a VLAN packet. The virtual switch 120 may encapsulate the VLAN packet in a VXLAN packet and forward 171 the packet to the attached routing component 140. The routing component 140 may reply 172 with its address information. The reply 172 may be received by the virtual switch 120, decapsulated from a VXLAN packet into a VLAN packet, and forwarded 173 to VM 111. VM 111 may use the routing component's address information as the default gateway to communicate with VMs that are not located on the host component 130. VM 111 may send 174 a VLAN packet to VM 112 using the routing component 140 as the default gateway. The virtual switch 120 may receive the VLAN packet, encapsulate the packet as a VXLAN packet, and forward 175 the packet to the routing component 140. The VXLAN packet may be forwarded 176 across the network using typical routing techniques. The packet may be received by the virtual switch 120 associated with VM 112. The virtual switch 120 may decapsulate the packet and forward 177 the resulting VLAN packet to VM 112. The network 100 functions, but does not support VM mobility. VM 111 must be reconfigured if it is moved to another host component 130, as the routing component 140 attached to Host 1 is still treated as the default gateway. Routing may still be achieved without reconfiguring VM 111 by implementing virtual router redundancy protocol (VRRP). However, this solution may be sub-optimal as all packets must continue to be routed through the routing component 140 attached to host 1 instead of merely requiring the packets to be routed through the routing component 140 attached to the new host component 130.

Figure 2:
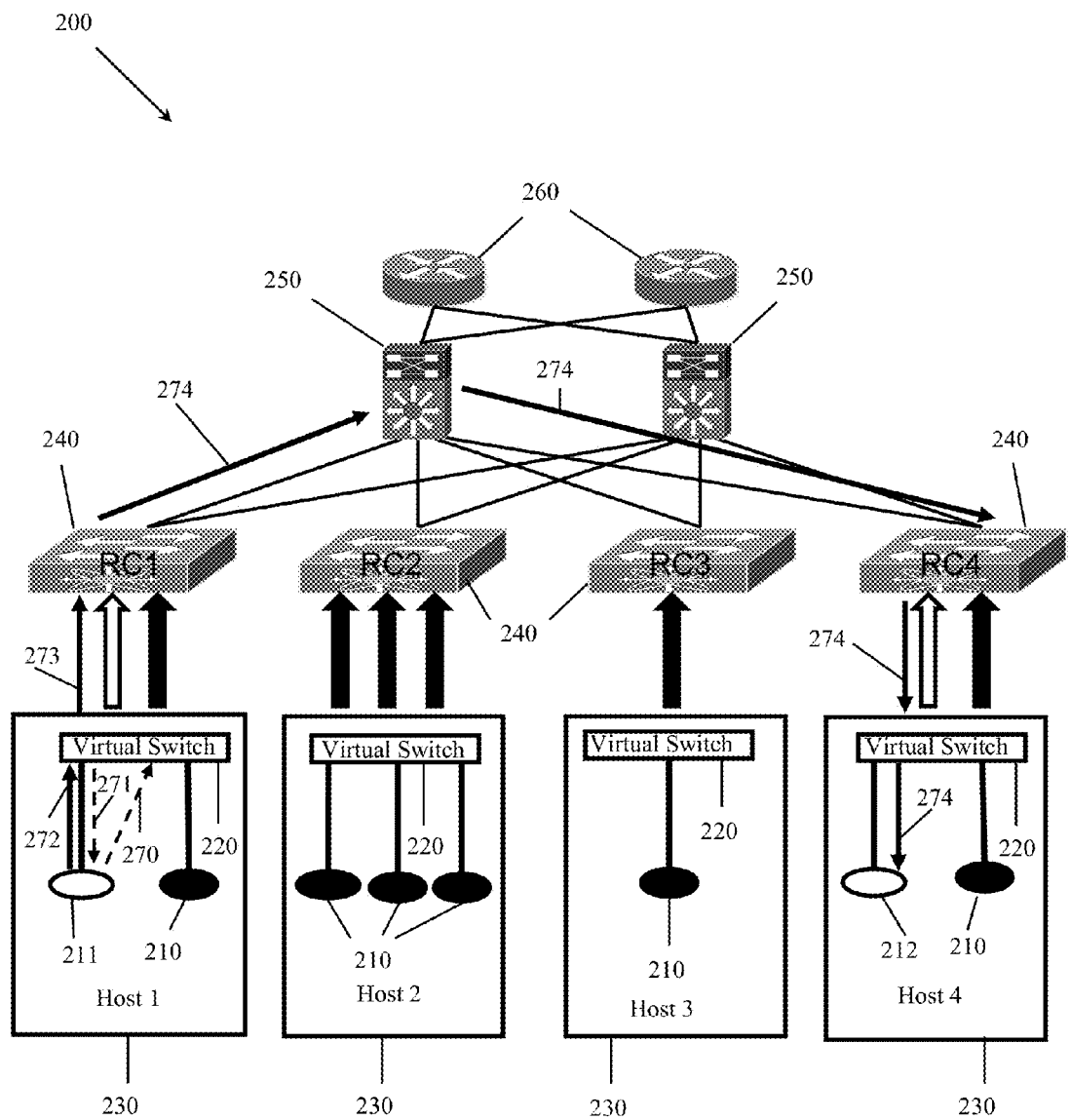
FIG. 2 is a connection diagram of an embodiment of a hybrid layer 2/layer 3 network that employs virtual switches as default gateways for VMs.

FIG. 2 is a connection diagram of an embodiment of a hybrid layer 2/layer 3 network 200 that employs virtual switches as default gateways for VMs. Network 200 contains substantially the same components as network 100, but is configured to accommodate VM 210 mobility. In network 200, VM 211 may send out a request for a default gateway upon joining the network. The virtual switch 220 on host 1 may respond with a vIP address for the VM's 211 IP subnet. The VM 211 may send a request 270 for a gateway MAC address. The request 270 may be an ARP request. The virtual switch 220 may receive the request 270 and reply 271 with a vMAC associated with the VM's 211 IP subnet. The VM 211 may need to send a communications packet to VM 212, a VLAN packet for example. VM 211 may send 272 the communications packet using the vMAC received from the virtual switch as the gateway address. The virtual switch 220 on host 1 may receive the communications packet from VM 211. The virtual switch 220 may be preconfigured with the attached routing component's 240 network address information for all IP subnets carried by the virtual switch 220. The virtual switch 220 may replace the gateway vMAC address in the address information of the communications packet with a MAC address of the attached routing component 240 that is associated with the VM's 211 IP subnet. In a VXLAN, the virtual switch 220 may also encapsulate the VLAN communications packet in a VXLAN communications packet. In alternate embodiments, the VLAN packet may be encapsulated by the routing component 240. The virtual switch 220 may forward 273 the communications packet out of the host component 230 to the attached routing component 240. The routing component 240 may receive the communications packet and forward 274 the packet to VM 212 using typical routing procedures. The packet may be forwarded through second tier 250 and/or third tier 260 routing components which may be substantially the same as 150 and 160. Network 200 allows for VM mobility because the virtual switches 220 forward packets to the closest default gateway.

Figure 3:
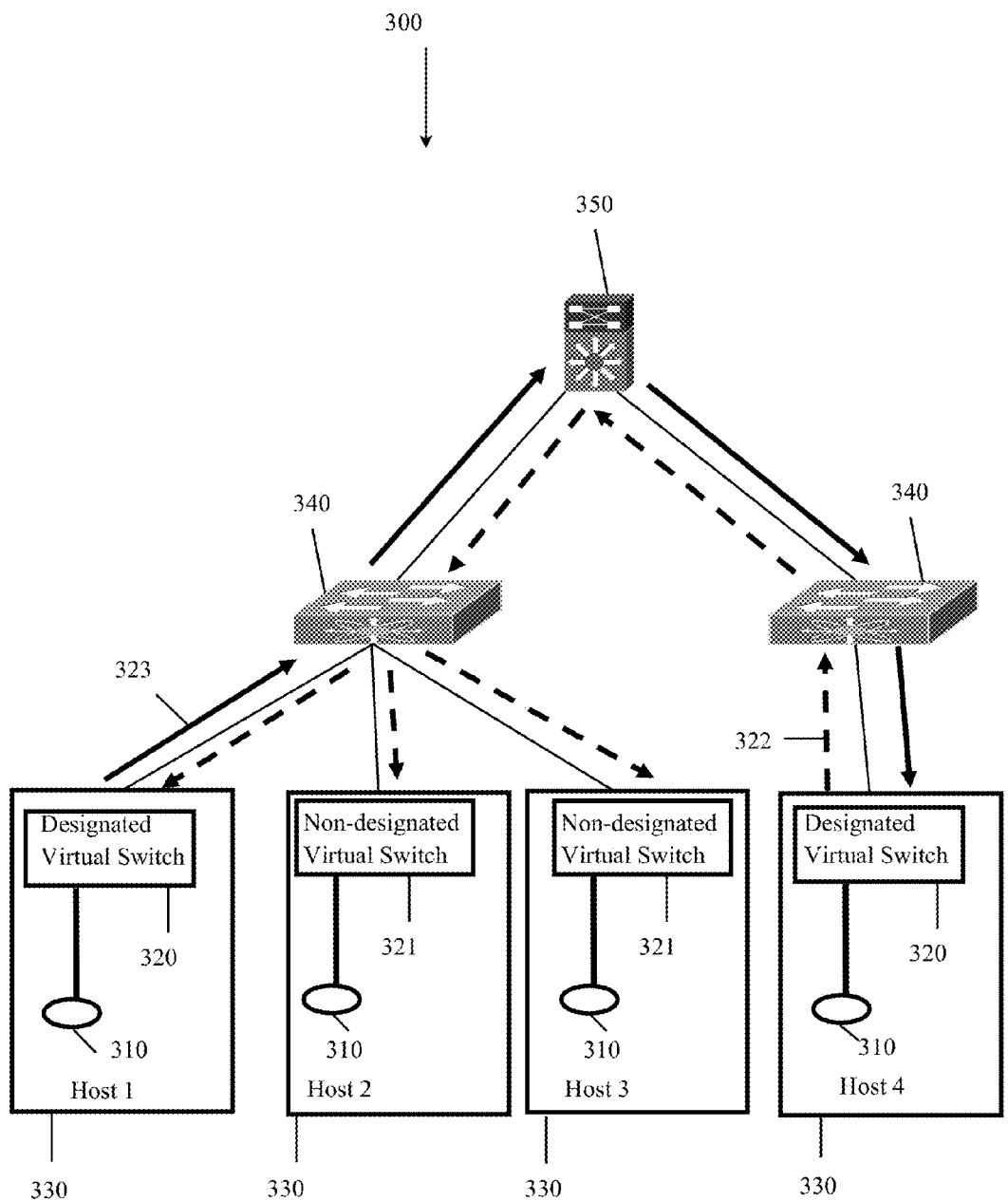
FIG. 3 is a connection diagram of an embodiment of a hybrid layer 2/layer 3 network comprising designated virtual switches that reduce unnecessary network address responses.

FIG. 3 is a connection diagram of an embodiment of a hybrid layer 2/layer 3 network 300 comprising designated virtual switches that reduce unnecessary network address responses. The network 300 comprises essentially the same components as network 200 in a different configuration. In network 300, multiple host components 330 may be attached to a common routing component 340. The routing components 340 may be connected by a second tier routing component 350. All VM's 310 shown are part of the same address group. All VMs that are not part of the address group and all third tier routing components have been omitted for reasons of clarity. Virtual switches may be part of an address group if they are connected to VMs 310 that are part of the address group. Members of an address group may communicate through multicasts, broadcasts, and/or anycasts. The host components 330 each comprise either a designated virtual switch 320 or a non-designated virtual switch 321. A designated virtual switch 320 is a virtual switch that has been designated to respond to address requests sent to the address group. A non-designated virtual switch 321 is configured to not respond to address requests sent to the address group. A non-designated virtual switch 321 may drop multicast, broadcast, or anycast address request packets. Designated virtual switches 320 may become non-designated virtual switches 321 and vice versa as the topology of network 300 changes. The virtual switch of host 4 may send an address request 322 to the address group. The address request 322 may be an ARP request. The virtual switches on hosts 1, 2, and 3 may all receive the address request because they are part of the same address group. The virtual switch on host 1 may send a reply 323 because it is the designated virtual switch 320, and the virtual switches on host 2 and host 3 may not reply because they are non-designated virtual switches 321. This configuration may reduce duplicative responses to the address request 322, which may slow overall network response time as additional components and address groups are connected to the network. Many different rules may be implemented to determine which virtual switch is the designated virtual switch 320. For example, the virtual switches may be configured to select the virtual switch with the lowest IP or vIP address as the designated switch 320. If the designated virtual switch 320 leaves the address group, for example if all VMs 310 move to another host, the non-designated virtual switch 321 with the lowest IP address of the address group may become the new designated virtual switch 320. Likewise, if a new virtual switch in the address group becomes connected to the routing component 340 and the new virtual switch has an address that is lower than the address of the designated virtual switch 320, the designated virtual switch 320 may become a non-designated virtual switch 321 and the new virtual switch may become the designated virtual switch 320.

Figure 4:
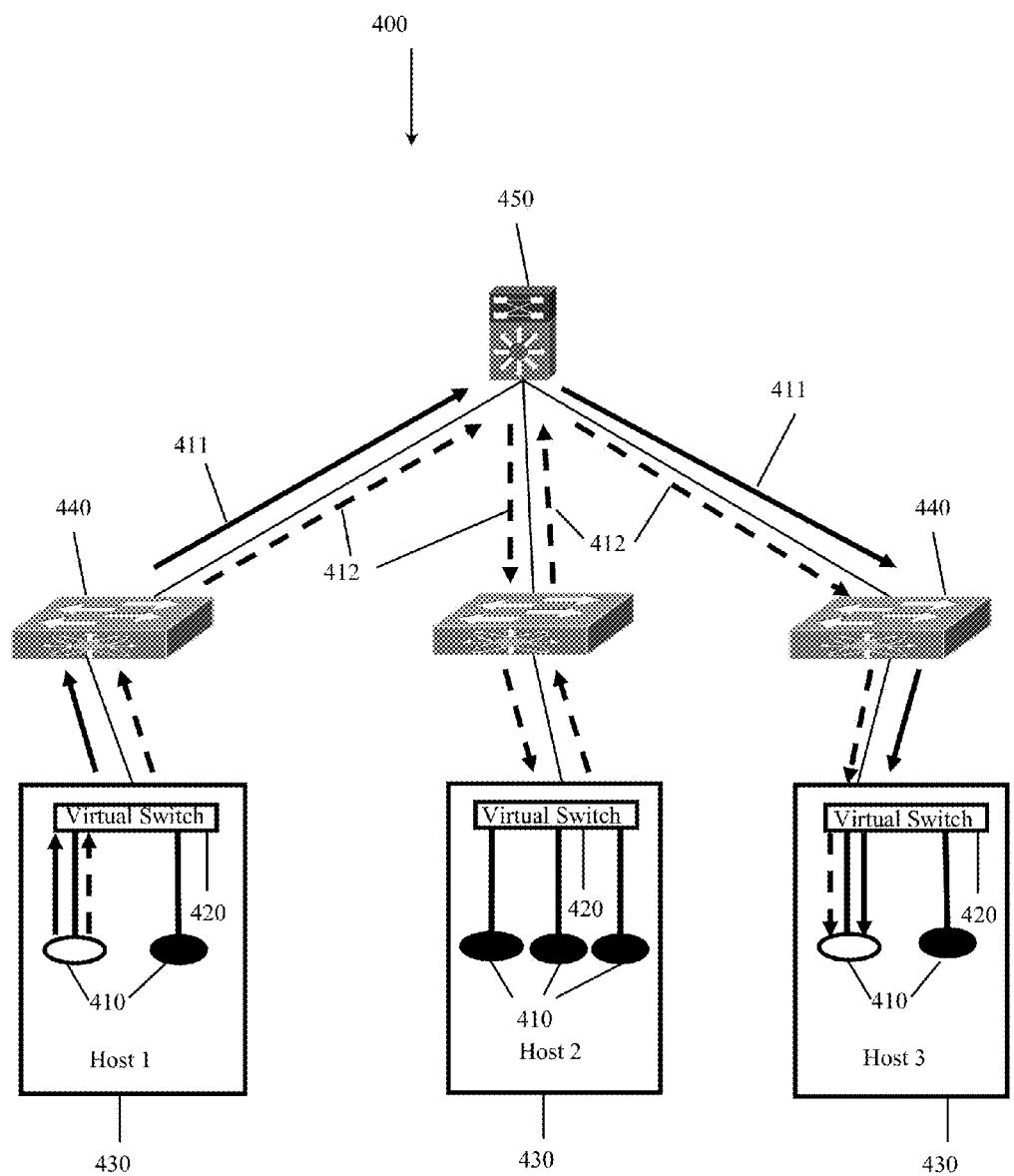
FIG. 4 is a connection diagram of an embodiment of a hybrid layer 2/layer 3 network configured to use host forwarding.

FIG. 4 is a connection diagram of an embodiment of a hybrid layer 2/layer 3 network 400 configured to use host forwarding. The network 400 comprises essentially the same components as network 200 in a different configuration. Network 400 comprises host components 430 each comprising a virtual switch 420 connected to one or more virtual machines 410. The host components 430 are connected to routing components 440 which are connected to a second tier routing component 450. Additional routing components are not depicted for purposes of clarity. Hybrid layer 2 over layer 3 networks, such as a VXLAN, may have a sub-optimal routing case. A routing component 440, based on its routing table, may see more than one routing component 440 as a path to a particular virtual machine 410. If the routing component 440 routes a packet to another routing component 440 that is not connected to the host component 430 that houses the destination virtual machine 410, the packet must be rerouted once it reaches a virtual switch 420. Routing path 412 is an example of a sub-optimal forwarding case. Routing path 411 is an example of the optimal routing path for network 400. The routing components 440 may use address requests to determine optimal paths to each host component 430. After the optimal routes have been determined by each routing component 440, host routing may be used to ensure that the optimal routing path 411 is chosen instead of the sub-optimal routing path 412.

Figure 5:
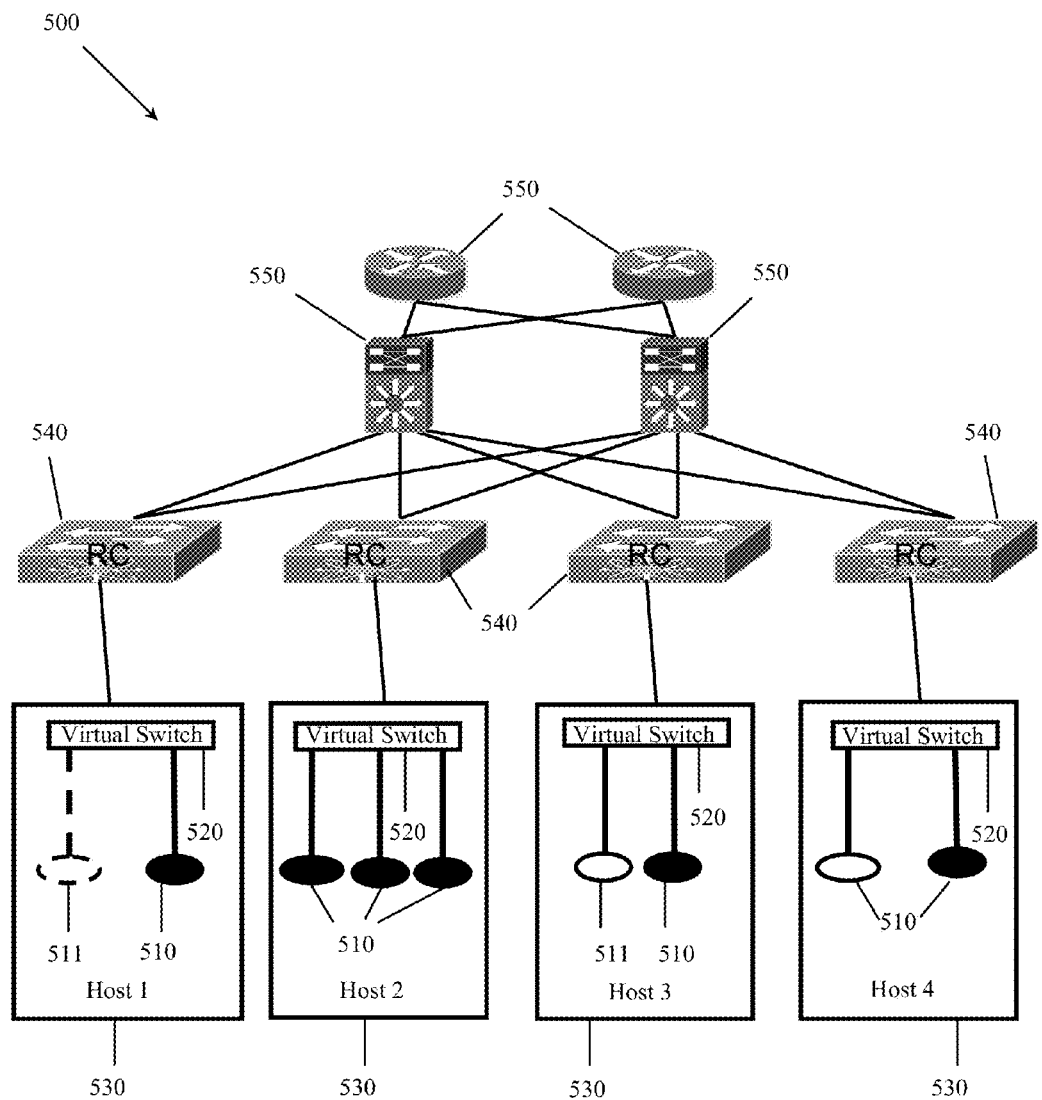
FIG. 5 is a connection diagram of an embodiment of a hybrid layer 2/layer 3 network with a mobile VM.

FIG. 5 is a connection diagram of an embodiment of a hybrid layer 2/layer 3 network 500 with a mobile VM. The network 500 comprises substantially the same components as network 200. The network 500 comprises a VM 511 that has moved from a first host component 530 to a second host component 530. The dashed VM 511 on Host 1 and the solid VM 511 on Host 3 indicate that the VM 511 has moved from Host 1 to Host 3. VM 511 may retain its address information so that reconfiguration of VM 511 is not necessary. When VM 511 sends additional communication packets, the virtual switch 520 on Host 3 may swap the vMAC address used as the default gateway with the MAC address of the attached routing component 540, allowing the packet to be routed by the routing component 540 attached to Host 3 instead of requiring the packet to be routed to the routing component 540 attached to Host 1.

When VM 511 moves from one host component 530 to another, a virtual switch 520 may change its designated or non-designated status. For example, if the virtual switch 520 on Host 1 was a designated virtual switch, it may be configured to lose its designated status by leaving the address group when VM 511 moves because the virtual switch 520 on Host 1 no longer carries a VM 510 that is part of the address group. A new designated virtual switch may be selected from the virtual switches 520 on Hosts 3 and 4. The virtual switch 520 with the lowest IP address may become the new designated virtual switch.

Figures 6, 7:
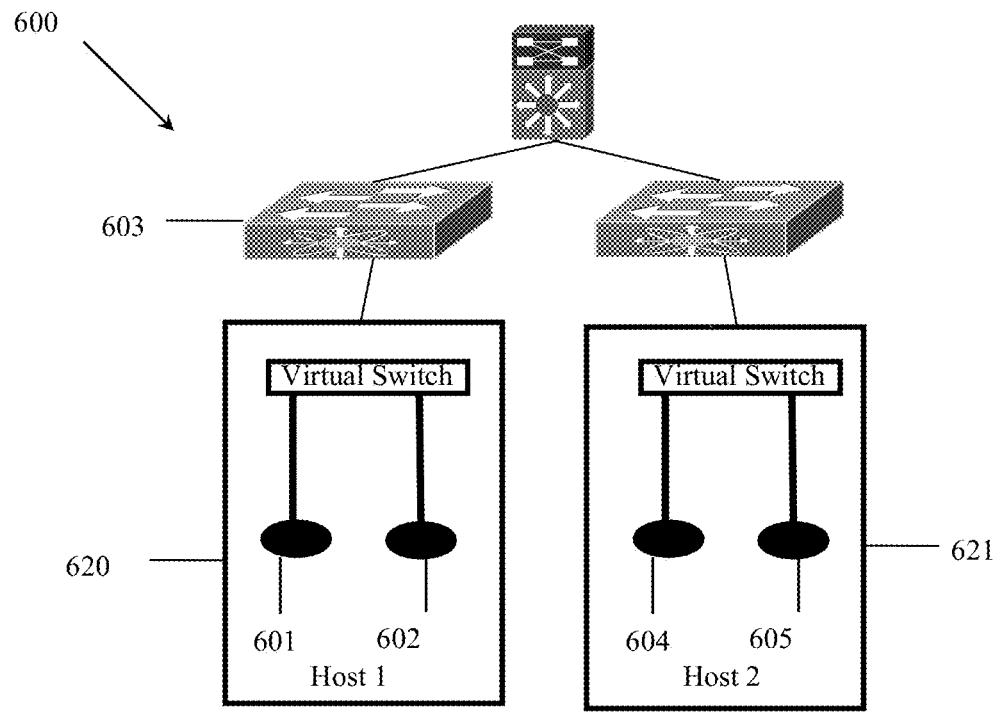
FIG. 6 is a connection diagram of an embodiment of a hybrid layer 2/layer 3 network with hypervisors.
FIG. 7 is a schematic diagram of an embodiment of a hypervisor routing table.

FIG. 6 is a connection diagram of an embodiment of a hybrid layer 2/layer 3 network 600 with hypervisors. The network 600 comprises substantially the same components as network 400 in a different configuration. The network 400 comprises a plurality of host components. Host 1 may further comprise a hypervisor 620. Hypervisor 620 may be a process that manages multiple VMs. Hypervisor 620 may perform routing for its VMs and may have a routing table similar to the routing table discussed in FIG. 7 below. Hypervisor 620 may comprise VM 601, VM 602, and a virtual switch. Host component 2 may comprise a hypervisor 621, which may be substantially similar to hypervisor 620, and may comprise VM 604, VM 605, and a virtual switch. Host 1 may be connected to an attached routing component 603. Host 1 and Host 2 may be connected by a network of other components/nodes.

FIG. 7 is a schematic diagram of an embodiment of a hypervisor routing table 700 for hypervisor 620. The routing table 700 may comprise a column of mac addresses 701 for VMs and non-virtual components known to the hypervisor. The routing table may also comprise a corresponding column of source ports 702, which may list the communications ports that the hypervisor 620 used to discover the components MAC addresses. VMs 601 and 602 have virtual ports because they are located on the hypervisor 620. Routing component 603 is the physical gateway for the VMs on the hypervisor 620. The MAC address for routing component 603 is discovered using a physical port because it is physically attached to the host component that runs the hypervisor 620. A VLAN tag may also be needed to discover the particular routing component 603 MAC address that is associated with the VLAN that the VMs belong to. VMs 604 and 605 are discovered using a remote IP protocol because they are located on a different host component.

Figure 8:
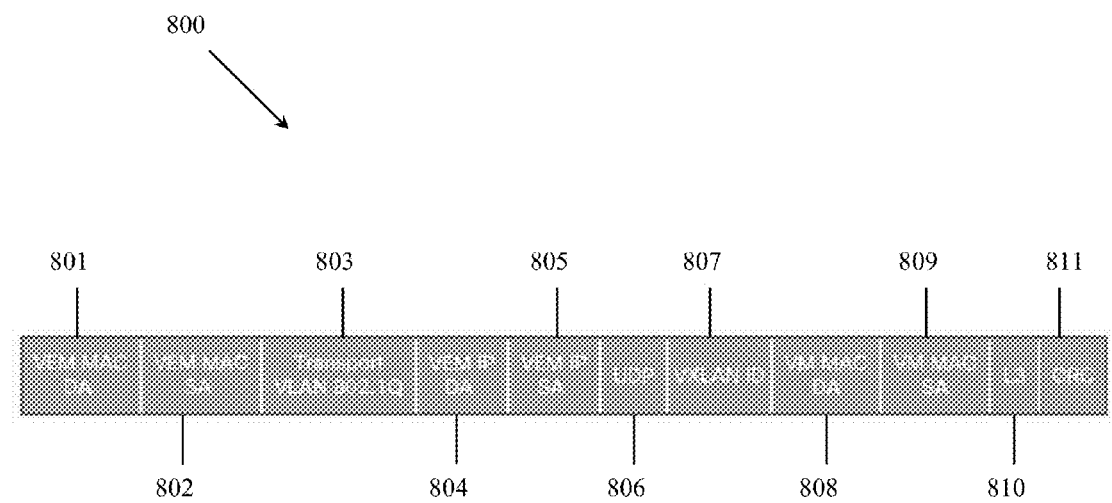
FIG. 8 is a diagram of an embodiment of a VXLAN communications packet.

FIG. 8 is a diagram of an embodiment of a VXLAN communications packet 800 as used in some of the embodiments discussed herein. The VXLAN packet 800 was discussed in draft-mahalingam-dutt-dcops-vxlan-00, which is incorporated by reference as if completely set forth herein. The VXLAN packet 800 may encapsulate a VLAN packet. The VXLAN packet 800 may comprise a Virtual Ethernet Module (VEM) MAC DA field 801 and a VEM MAC SA field 802, which comprise the packet's outer next hop address and source hop mac address respectively. Each of these values may be updated each time the packet 800 makes a hop to a new node. The VXLAN packet 800 may further comprise a transport VLAN 802.1 Q tag 803, which may be used to encode information about the VXLAN the packet 800 belongs to. The VXLAN packet 800 may further comprise a VEM IP DA field 804 and a VEM IP SA field 805, which may comprise the IP addresses of the destination VTEP and the source VTEP. The VXLAN packet 800 may further comprise a UDP field 806, which may comprise VTEP port information. The VXLAN packet 800 may further comprise a VXLAN ID field 807, which may indicate the VXLAN network that the packet 800 belongs to. The VXLAN packet 800 may comprise a VM MAC DA field 808 and a VM MAC SA field 809, which comprise the encapsulated VLAN destination and source MAC addresses. The VXLAN packet 800 may comprise a L3 field 810, which may comprise a VLAN identification tag and a payload of the information to be communicated. The VXLAN packet 800 may comprise a CRC field 811, which may contain information used for transmission error checking purposes.

Figure 9:
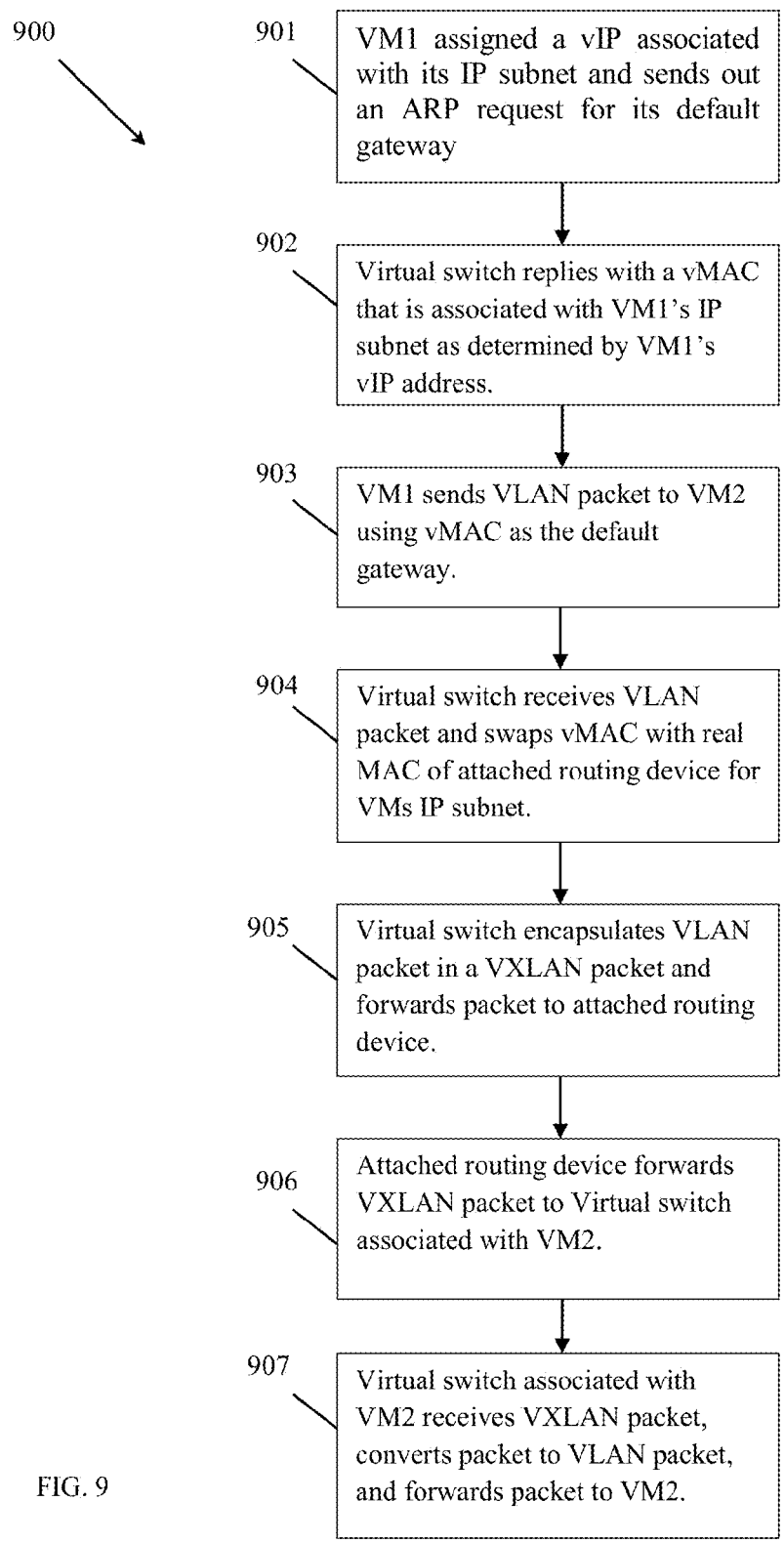
FIG. 9 is a flow chart of an embodiment of a method of sending a packet between VMs in a hybrid layer 2/layer 3 network.

FIG. 9 is a flow chart of an embodiment of a method 900 of sending a packet between VMs in a hybrid layer 2/layer 3 network. When a first VM joins a VXLAN, the first VM may be assigned a vIP address associated with its IP subnet and a vMAC address. Such address information may be assigned in whole or in part by the virtual switch, in this case a VTEP, or another software or hardware portion of the host component. Such address information may or may not be obtained through communication with other virtual switches that are part of the same address group. At step 901, the first VM may then send out an ARP request to determine its default gateway. At step 902, the virtual switch may reply to the ARP request with a vMAC that is associated with the first VMs IP subnet as determined by the first VMs vIP. The first VM may then send a communications packet, in this case a VLAN packet with a VLAN tag, to a second VM at step 903. The first VM may use the vMAC obtained from the virtual switch as the gateway address in the packet. At step 904, the virtual switch may receive the communications packet from the first VM, obtain a list of the real MAC addresses of the attached routing component, select the real MAC address that is associated with the VMs IP subnet, and swap the gateway vMAC address of the packet with the selected real MAC address. The list of real MAC addresses for the attached routing component may be predetermined and saved by the virtual switch for use as needed. At step 905, the virtual switch may also encapsulate the VLAN packet in a VXLAN packet and forward the packet to the attached routing device. At step 906, the attached routing device may then receive the VXLAN packet and forward the packet using host routing or other routing techniques. At step 907, the virtual switch associated with the second VM may receive the VXLAN packet, convert the packet into a VLAN packet and forward the packet to the second VM or broadcast/multicast/anycast the packet across the second VMs VLAN.

Figure 10:
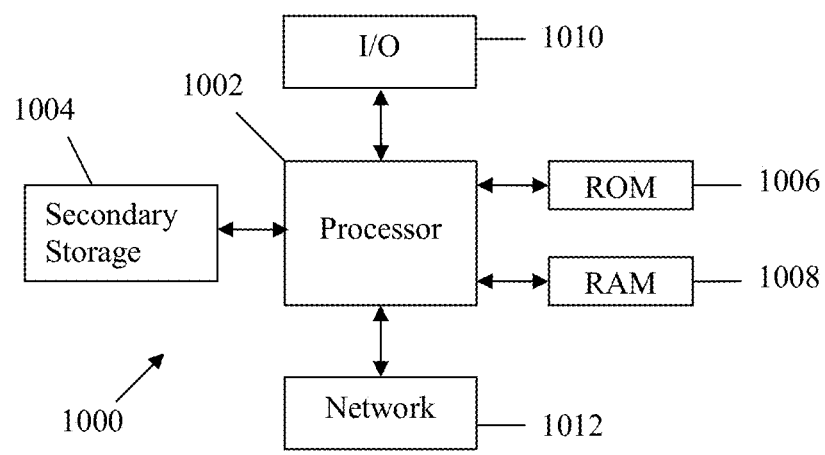
FIG. 10 is a schematic diagram of one embodiment of a general-purpose computer system.

At least some of the components and/or processes described above may be implemented on any general-purpose network component, such as a computer or network component with sufficient processing power, memory resources, and network throughput capability to handle the necessary workload placed upon it. FIG. 10 illustrates a typical, general-purpose network component suitable for implementing one or more embodiments of the components and methods disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor may be implemented as one or more CPU chips, or may be part of one or more application specific integrated circuits (ASICs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

Multiple embodiments are disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of employing a virtual switch as a default gateway for a virtual machine (VM) within a layer 3 (L3) virtual extensible local area network (VXLAN), the method comprising:
    sending an address request reply comprising a virtual media access control (MAC) address associated with a virtual interact protocol (IP) address, from a virtual switch to a VM;
    setting the virtual switch as the VM's default gateway;
    receiving a virtual local area network (VLAN) data packet with the virtual MAC address from the VM;
    swapping the virtual MAC address of the data packet with the MAC address of a first routing component;
    encapsulating, by the virtual switch, the data packet in a VXLAN packet; and
    forwarding the data packet from the virtual switch to the first routing component via a VXLAN tunnel,
    wherein the data packet comprises a VLAN tag that identifies a VLAN to which the VM belongs, and
    wherein the data packet is forwarded from the virtual switch to the first routing component as a layer 2 (L2) packet routed over the L3 VXLAN.

2. The method of claim 1, wherein the virtual switch comprises a VXLAN tunnel end point (VTEP) for the VXLAN, wherein the virtual IP address corresponds to an IP address of the first routing component, wherein the first routing component is associated with the IP address of the VM, and wherein the IP address of the VM references the L3 VXLAN.

3. The method of claim 2, wherein the first routing component is configured to forward the data packet as a L3 packet to a second routing component located in a second VXLAN.

4. The method of claim 1, further comprising receiving an address request for a default gateway from the VM after moving the VM from a first host component to a second host component.

5. The method of claim 1, wherein a plurality of virtual switches are connected to the first routing component, Wherein all of the virtual switches belong to a same VXLAN address group, wherein one of the virtual switches is designated to respond to one or more address requests sent to the virtual switches that belong to the same VXLAN address group.

6. The method of claim 5, wherein a remaining of he virtual switches discard the address requests.

7. The method of claim 1, wherein the VLAN identified by the VLAN tag maps to the L3 VXLAN associated with the VM.

8. An apparatus for routing packets between a virtual machine (VM) to a routing component within a virtual extensible local area network (VXLAN), comprising:
    a host component comprising a virtual switch associated with the VM;
    wherein the host component is in communication with a routing component which is connected to the VXLAN and comprises a network address, and
    wherein the host component comprises an executable memory that causes the virtual switch to:
        receive a virtual local area network (VLAN) communication packet that comprises a virtual destination address from the VM;
        replace the virtual destination address of the communications packet with the network address of the routing component;
        encapsulate the communications packet in a VXLAN packet; and
        forward the communication packet to the routing component via a VXLAN tunnel,
        wherein the communication packet comprises a VLAN tag that identifies a VLAN to which the VM belongs, and
        wherein the communication packet is forwarded from the virtual switch to the routing component as a layer 2 (L2) packet routed over the VXLAN.

9. The apparatus of claim 8, wherein the VXLAN is a layer 3 (L3) network, and wherein the VLAN identified by the VLAN tag corresponds to the VXLAN the VM participates in.

10. The apparatus of claim 9, wherein the executable memory causes the virtual switch to receive an address request from the VM that requests a media access control (MAC) address of a gateway for sending communications packets.

11. The apparatus of claim 10, wherein the executable memory causes the virtual switch to reply to the address request with a virtual MAC that is dependent on a virtual interne protocol (IP) subnet to which the VM belongs.

12. The apparatus of claim 11, wherein replacing the virtual destination address of the communications packet with the network address of a routing component comprises replacing the virtual MAC address with the MAC address of the routing component that is associated with the virtual IP subnet.

13. The apparatus of claim 8, wherein the VM, the virtual switch, and the routing component participates within the same VXLAN, and wherein the executable memory causes the virtual switch to:
   receive a VXLAN communication packet from the routing component;
   de-encapsulate the VXLAN communication packet into a VLAN packet; and
   forward the VLAN packet to the VM.

14. The apparatus of claim 13, wherein the virtual switch comprises a VXLAN tunnel endpoint (VTEP), and wherein encapsulating the communications packet in a VXLAN packet comprises appending a VXLAN header to the communications packet prior to forwarding the communication packet to the routing component.

15. The apparatus of claim 8, wherein the executable memory further causes the virtual switch to receive an address request that corresponds to a VXLAN address group and respond to the address request that corresponds to the VXLAN address group when the virtual switch is selected as a designated virtual switch for the VXLAN address group.

16. The apparatus of claim 8, wherein the executable memory further causes the virtual switch to discard the address request that corresponds to the VXLAN address group when the virtual switch is selected as a non-designated virtual switch, and wherein the virtual switch and at least another virtual switch are part of the VXLAN address group.

17. A computer program product comprising computer executable instructions stored on a non-transitory medium that when executed by a processor causes a virtual switch to perform the following:
   receive an address request from a virtual machine (VM) that requests information for a default gateway;
   transmit an address request reply that comprises a virtual media access control (MAC) and a virtual internet protocol (IP) address to the VM;
   receive a virtual local area network (VLAN) data packet with the virtual MAC address from the VM;
   replace the virtual MAC address of the data packet with the MAC address of a routing component;
   encapsulate the VLAN data packet in a virtual extensible local area network (VXLAN) packet; and
   forward the encapsulated VLAN data packet to the routing component via a layer 2 (L2) packet routed over a layer 3 (L3) VXLAN tunnel,
   wherein the virtual MAC and the virtual IP address identifies the virtual switch as the default gateway, and
   wherein the VLAN data packet comprises a VLAN tag that identifies a VLAN to which the VM belongs.

18. The computer program product of claim 17, wherein the virtual switch is part of an address group that associates a plurality of other virtual switches, wherein the computer executable instructions further cause the virtual switch to receive a second address request that corresponds to the address group and reply to the second address request when the virtual switch is a designated virtual switch.

19. The computer program product of claim 18, wherein the computer executable instructions further causes the virtual switch to discard the second address request when the virtual switch is a non-designated virtual switch.

20. The computer program product of claim 17, wherein the routing component is associated with an IP address assigned to the VM, and wherein the VLAN identified by the VLAN tag maps to the L3 VXLAN associated with the VM.

21. The computer program product of claim 17, wherein the computer executable instructions further cause the virtual switch to encapsulate a VXLAN header to the VLAN data packet to form a VXLAN data packet and forward the VXLAN data packet to the routing component.

* * * * *

UNITED STATES PATENT AND TRADEMARK OFFICE
CERTIFICATE OF CORRECTION

PATENT NO. : 8,923,155 B2  
APPLICATION NO. : 13/887782  
DATED : December 30, 2014  
INVENTOR(S) : Xiaorong Qu et al.

Page 1 of 1

It is certified that error appears in the above-identified patent and that said Letters Patent is hereby corrected as shown below:

In the Claims:

Column 10, Lines 24-30, Claim 5, should read as:
-- 5. The method of claim 1, wherein a plurality of virtual switches are connected to the first routing component, wherein all of the virtual switches belong to a same VXLAN address group, wherein one of the virtual switches is designated to respond to one or more address requests sent to the virtual switches that belong to the same VXLAN address group. --

Column 10, Lines 31-32, Claim 6, should read as:
-- 6. The method of claim 5, wherein a remaining of the virtual switches discard the address requests. --

Signed and Sealed this
Fifth Day of May, 2015

Michelle K. Lee
*Director of the United States Patent and Trademark Office*